H. PRAHL.
MECHANICAL TIME FUSE.
APPLICATION FILED FEB. 6, 1915.

1,214,069.

Patented Jan. 30, 1917.

WITNESSES
Mildred P. Imurie
Arthur C. Prohey

INVENTOR
Hugo Prahl
his Attorney

UNITED STATES PATENT OFFICE.

HUGO PRAHL, OF DUSSELDORF, GERMANY, ASSIGNOR TO RHEINISCHE METALL-
WAAREN- UND MASCHINENFABRIK, OF DUSSELDORF-DERENDORF, GERMANY,
A CORPORATION OF GERMANY.

MECHANICAL TIME-FUSE.

1,214,069.　　　　　Specification of Letters Patent.　　Patented Jan. 30, 1917.

Application filed February 6, 1915.   Serial No. 6,624.

*To all whom it may concern:*

Be it known that I, HUGO PRAHL, engineer, a subject of the German Emperor, residing at 79 Verdingerstrasse, Dusseldorf, Germany, have invented certain new and useful Improvements in Mechanical Time-Fuses; and I do hereby declare the following to be a full, clear, and exact description of the invention, such as will enable others skilled in the art to which it appertains to make and use the same.

My invention relates to improvements in mechanical time fuses having a clock-work driven by a spring. In such fuses as heretofore known the driving spring has generally been constructed as a spiral spring. Such springs are subject to the influence of centrifugal force during flight of the projectile, and they require a large amount of space because of the length or diameter required to give the necessary power to the spring.

According to my invention the influence of centrifugal force is overcome by the use of a plurality of helical springs arranged in or nearly in the axis of the shell, such springs being cylindrical, conical, or of any other suitable form. I prefer to use a plurality of such helical springs and to arrange them coaxially, one within the other, such arrangement requiring but a small amount of space.

A further advantage of my invention is the absence of friction between the single windings of the spring, making lubrication unnecessary.

An embodiment of my invention is shown in the accompanying drawings in which—

Figure 1:
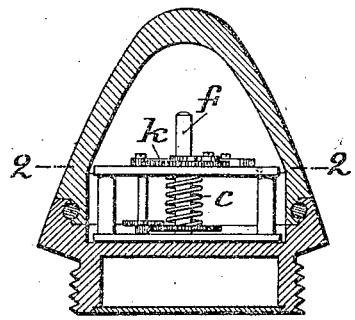
Figure 3:
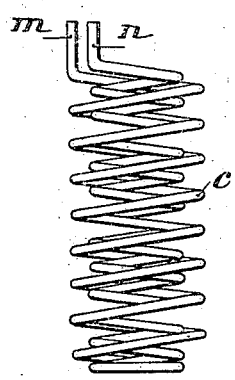
Figure 2:
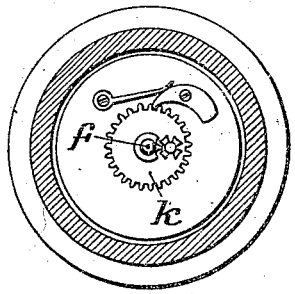
Figure 5:
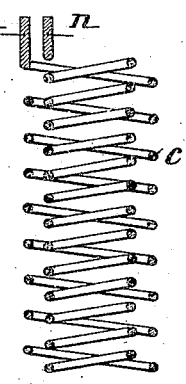
Figure 4:
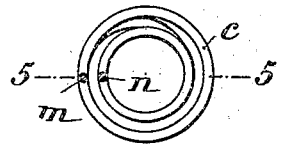

Figure 1 is an axial section through a fuse provided with a spring according to my invention but showing only the essential parts necessary for understanding my invention. Fig. 2 is a cross section on line 2—2 of Fig. 1. Fig. 3 is an enlarged side view of the spring. Fig. 4 is a plan view of the same and Fig. 5 is a section on line 5—5 of Fig. 4.

As stated the clock work of the time fuse is not completely shown in Figs. 1 and 2, because this is not necessary for understanding the invention.

The driving spring $c$ is arranged in the axis of the rotation of the shell. As shown by Figs. 3, 4 and 5 the spring consists of a single wire bent to form two oppositely wound spaced apart coils, one within the other, the two coils having a common axis so as to form indeed two springs arranged coaxially one within the other. It is self-evident that instead of a single wire the springs may be spirally formed and then connected. It is also manifest that the spring may have the shape of a truncated cone or of a cask.

The spring is fastened with its end $n$ to the shaft $f$ of the driving wheel and with its other end $m$ to the winding up wheel $k$. The latter is connected with the shaft $f$ by means of any known regulation device which has for its purpose to allow the spring to be wound up only for a limited number of revolutions and further to allow the driving shaft $f$ only a limited number of revolutions if the clock work runs down. Therefore if the fuse is adjusted to act as a percussion fuse the action of the time fuse device is locked so that the clock work will be arrested by the said regulation device before having reached the point in which the time fuse would come into action.

In Figs. 1 and 2 I have shown by way of example a so-called Maltese regulation device. If only one rotation or nearly so shall be possible a simple abutment or pin arranged on the winding up wheel $k$ and adapted to engage an arm or pin of the driving shaft $f$ will be sufficient for the said purpose.

The spring may be of any cross section and made of any material. It may consist of one or several pieces.

What I claim is:

In a mechanical time fuse having clock-work mechanism, a driving spring for said mechanism comprising spaced apart oppositely wound convolutions arranged coaxially with respect to each other and to the axis of rotation of the projectile.

In testimony whereof, I have signed this specification in the presence of two subscribing witnesses.

HUGO PRAHL. [L. S.]

Witnesses:
　HELEN NUFER,
　ALBERT NUFER.